US010116158B2

(12) United States Patent
Diederichs et al.

(10) Patent No.: US 10,116,158 B2
(45) Date of Patent: Oct. 30, 2018

(54) POWER MANAGEMENT SYSTEM WITH SELECTIVE SOURCE DEPLETION

(71) Applicant: Cameron International Corporation, Houston, TX (US)

(72) Inventors: Robert Diederichs, Edmonton (CA); Thomas M. Madden, Duncan, OK (US); Daniel Peters, Edmonton (CA)

(73) Assignee: Cameron International Corporation, Houston, TX (US)

( * ) Notice: Subject to any disclaimer, the term of this patent is extended or adjusted under 35 U.S.C. 154(b) by 590 days.

(21) Appl. No.: 14/139,637

(22) Filed: Dec. 23, 2013

(65) Prior Publication Data
US 2015/0180277 A1 Jun. 25, 2015

(51) Int. Cl.
*H02J 7/00* (2006.01)
(52) U.S. Cl.
CPC ......... *H02J 7/0063* (2013.01); *Y10T 307/625* (2015.04)
(58) Field of Classification Search
CPC .................. H02J 7/0063; Y10T 307/625
USPC .......................................................... 307/66
See application file for complete search history.

(56) References Cited

U.S. PATENT DOCUMENTS

| | | | |
|---|---|---|---|
| 6,183,412 B1 * | 2/2001 | Benkowski | A61M 1/1031 600/16 |
| 6,268,711 B1 | 7/2001 | Bearfield | |
| 2001/0007417 A1 * | 7/2001 | Kitagawa | H02J 7/0068 320/128 |
| 2002/0070869 A1 * | 6/2002 | Dungan | G01N 33/0073 340/632 |
| 2004/0147972 A1 * | 7/2004 | Greatbatch | A61N 1/378 607/34 |
| 2005/0275289 A1 * | 12/2005 | Jabaji | B60L 1/00 307/10.1 |
| 2007/0279004 A1 * | 12/2007 | Wang | H02J 7/0019 320/128 |
| 2009/0142629 A1 | 6/2009 | Titschert et al. | |
| 2010/0019569 A1 * | 1/2010 | Izumi | B60L 11/1868 307/9.1 |

(Continued)

FOREIGN PATENT DOCUMENTS

| | | |
|---|---|---|
| JP | 2005354851 A | 12/2005 |
| JP | 2009276201 A | 11/2009 |

(Continued)

OTHER PUBLICATIONS

International Search Report and Written Opinion Issued in Application No. PCT/US2014/072223, dated Mar. 25, 2015 (7 Pages).

*Primary Examiner* — Jared Fureman
*Assistant Examiner* — Emmanuel R Dominique
(74) *Attorney, Agent, or Firm* — Chamberlain Hrdlicka

(57) ABSTRACT

A power management system to manage energy sources for use with an energy-powered component includes an energy source detector to determine, between a first and a second of the energy sources, which has a lower state-of-charge and which has a higher state-of-charge, a controller to designate the energy source with the lower state-of-charge as a primary energy source and the other energy source as a secondary energy source, and an energy source selector to selectively enable the primary energy source to provide power to the energy-powered component.

18 Claims, 4 Drawing Sheets

(56) References Cited

U.S. PATENT DOCUMENTS

| | | | |
|---|---|---|---|
| 2010/0087961 | A1 | 4/2010 | Velez |
| 2010/0187430 | A1 | 7/2010 | Yoshimuta |
| 2010/0264740 | A1* | 10/2010 | Lee ................. H02J 7/0016 307/80 |
| 2012/0112785 | A1* | 5/2012 | Mizoguchi ....... G01R 19/16542 324/762.08 |

FOREIGN PATENT DOCUMENTS

| | | |
|---|---|---|
| JP | 2011065286 A | 3/2011 |
| JP | 2012060884 A | 3/2012 |
| WO | 2013163647 | 10/2013 |

* cited by examiner

POWER MANAGEMENT SYSTEM WITH SELECTIVE SOURCE DEPLETION

BACKGROUND

Different protection techniques may be used to ensure the safe operation of electrical equipment in hazardous areas. A hazardous area is generally one where flammable gases and/or particles are present, or could be present. Two common protection methods to prevent the accidental ignition of flammable gases or particles include using electrical equipment that is rated as explosion proof and/or intrinsically safe. Explosion proof refers to equipment that is designed to contain an internal explosion resulting from the flammable gases and particulate entering the electronics. This ability to contain an internal explosion prevents subsequent ignition of the surrounding atmosphere. Intrinsic safety requirements are intended to guarantee that instrument operation or failure cannot cause ignition, such as if the instrument is properly installed in an environment that contains explosive gases. This is accomplished by limiting the maximum energy stored in the device in a worst case failure situation. Excessive energy discharge may lead to sparking or excessive heat, which could ignite an explosive environment in which the transmitter may be operating.

Such techniques and tools are highly useful in the process control and measurement industry to allow operators to conveniently communicate with and/or interrogate field devices in a given process installation. Examples of such process installations include petroleum, pharmaceutical, chemical, pulp, and other processing installations. In such installations, the process control and measurement network may include tens or even hundreds of various explosion proof and intrinsically safe field devices that periodically require maintenance to ensure that such devices are functioning properly and/or calibrated. As such, these field devices may be used or implemented as portable electronic devices that use energy sources, such as batteries, for power. However, if the device is not intrinsically safe, the device may not be opened, such as when replacing batteries for the electronic device, unless the surrounding area is declassified as non-hazardous. Accordingly, it remains a priority to increase the power management capabilities of such devices, particularly in environments commonly that may be hazardous.

BRIEF DESCRIPTION OF THE DRAWINGS

For a detailed description of the preferred embodiments of the invention, reference will now be made to the accompanying drawings in which.

DETAILED DESCRIPTION

Figure 1:
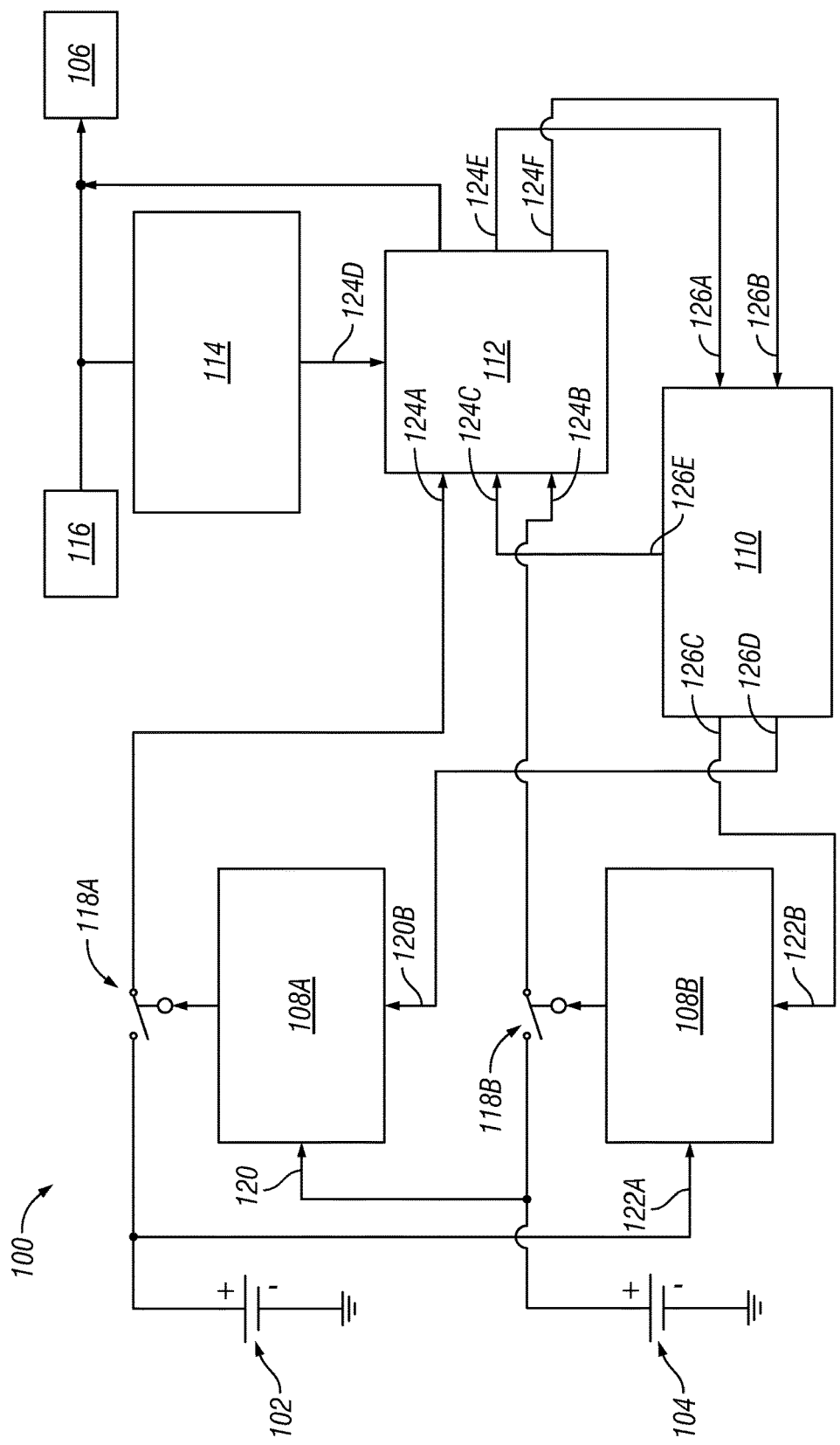
FIG. 1 shows a block diagram for a power management system in accordance with one or more embodiments of the present disclosure.

The following discussion is directed to various embodiments of the invention. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed below may be employed separately or in any suitable combination to produce desired results. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but are the same structure or function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. In addition, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. The use of "top," "bottom," "above," "below," and variations of these terms is made for convenience, but does not require any particular orientation of the components.

Accordingly, disclosed herein is a power management system and a method to manage energy sources for use with an energy-powered component. In one or more embodiments, the power management system may include an energy source detector, a controller, and an energy source selector. The energy source detector may be used to determine, between a first and a second of the energy sources, which of the energy sources has a lower state-of-charge and which has a higher state-of-charge. The controller may be used to designate the energy source with the lower state-of-charge as a primary energy source and the other energy source as a secondary energy source. The energy source selector may be used to selectively enable the primary energy source to provide power to the energy-powered component. Further, the energy source selector may be used to disable the secondary energy source from providing power to the energy-powered component.

The power management system may further include an external power detector to determine if an external power source is available, in which the energy source selector may be used to enable the external power source to provide power to the energy-powered component and/or to disable the primary energy source from providing power to the energy-powered component.

The controller may be used to determine if power required by the energy-powered component is above an amount of power available from the primary energy source. If power required by the energy-powered component is above the amount of power available from the primary energy source, the energy source selector may be used to enable the primary energy source and the secondary energy source to provide power to the energy-powered component. In one embodiment, the energy source selector may allow the primary energy source and the secondary energy source to provide power to the energy-powered component at a ratio inversely proportional to a ratio of a source impedance of the primary energy source to a source impedance of the secondary energy source. In another embodiment, the energy source selector may allow the primary energy source and the secondary energy source to provide equal amounts of power to the energy-powered component. In yet another embodiment, the energy source selector may only allow the secondary energy source to provide an amount of power to the energy-powered component equal to the difference between the power required by the energy-powered component and the power available from the primary energy source. Further, once the state-of-charge of the primary energy source is below a pre-determined threshold amount, the controller may designate the other energy source as the primary energy source.

Additionally, the power management system may include an explosion proof enclosure with an electrical connector. In such an embodiment, the energy source detector, the controller, the energy source selector, the external power detector, the first energy source, and/or the second energy source may be positioned within the explosion proof enclosure. Further, the external power source is then positioned external the explosion proof enclosure, and is coupled to the electrical connector of the explosion proof enclosure.

Referring now to FIG. 1, a block diagram for a power management system 100 in accordance with one or more embodiments of the present disclosure is shown. The power management system 100 is used to manage energy sources, such as a first energy source 102 and a second energy source 104, that are used to power an energy-powered component 106. The present disclosure only shows two energy sources in FIG. 1. However, those having ordinary skill in the art will appreciate that the present disclosure is not so limited, as more than two energy sources may be incorporated into an embodiment in accordance with the present disclosure.

The power management system 100 may include one or more energy source detectors 108, one or more controllers 110, and one or more energy source selectors 112. In this embodiment, the power management system 100 is shown including a first energy source detector 108A and a second energy source detector 108B. Further, the power management system 100 is shown in this embodiment as including only one controller 110 and one energy source selector 112.

Each of the energy source detectors 108 may be used to determine amongst two or more energy sources, which of the energy sources has a higher or highest state-of-charge ("SOC"), and which of the energy sources has a lower or lowest SOC. For example, with reference to FIG. 1, each of the energy source detectors 108 may be able to determine, between the first energy source 102 and the second energy source 104, which has a lower SOC and which has a higher SOC. In this embodiment, the energy source that has the lower SOC will be used first for providing power to the energy-powered component 106. An example of an energy source detector in accordance with the present disclosure may include a voltage comparator, though other examples of energy source detectors may be used without departing from the scope of the present disclosure.

Once the SOC of the energy sources has been determine, the controller 110 may be used to designate the energy source with the lower SOC as a primary energy source and the energy source with the higher SOC as a secondary energy source. As such, the energy source selector 112 may then be used to selectively enable the primary energy source to provide power to the energy-powered component 106. For example, the energy source selector 112 may enable the primary energy source to provide power to the energy-powered component 106 while also disabling the secondary energy source from providing power to the energy-powered component 106. In such an embodiment, only the energy source with the lower SOC may be able to provide energy and power to the energy-powered component 106, thereby depleting the energy source with the lower SOC first before using the energy source with the higher SOC for energy and power. An example of a controller in accordance with the present disclosure may include a microcontroller, an integrated circuit, and/or a processor without departing from the scope of the present disclosure.

In accordance with one or more embodiments of the present disclosure, one or more components of the power management system 100 may be able to measure an amount of power or energy consumed or needed by the energy-powered component 106. For example, in one or more embodiments, the controller 110 may be able to measure an amount of power or energy consumed or needed by the energy-powered component 106, and may also be used to determine if power or energy consumed by the energy-powered component 106 is above an amount available from the primary energy source.

In such an embodiment, if power or energy consumed by the energy-powered component 106 is above an amount of power or energy available from the primary energy source, then the controller 110 and/or the energy source selector 112 may be used to enable the primary energy source and the secondary energy source to provide power and energy to the energy-powered component 106. In one embodiment, the energy source selector 112 may allow the primary energy source and the secondary energy source to provide power to the energy-powered component 106 at a ratio inversely proportional to a ratio of a source impedance of the primary energy source to a source impedance of the secondary energy source. In such an embodiment, the energy source with the lower source impedance would be able to contribute a greater proportional amount of power to the energy-powered component 106. Accordingly, as the primary energy source may have an overall lower SOC, the primary energy source may have a lower source impedance, thereby enabling the primary energy source to contribute a greater proportional amount of power to the energy-powered component 106 than the secondary energy source.

In another embodiment, the controller 110 and/or the energy source selector 112 may allow the primary energy source and the secondary energy source to provide equal amounts of power or energy to the energy-powered component 106. In yet another embodiment, the controller 110 and/or the energy source selector 112 may only allow the secondary energy source to provide an amount of power or energy to the energy-powered component 106 equal to the difference between the power or energy consumed by the energy-powered component 106 and the power or energy available from the primary energy source. As such, the primary energy source may still be used at full capacity within the power management system 100 to provide power or energy to the energy-powered component 106, whereas the secondary energy source may be used to only fulfill power or energy needs for the energy-powered component 106 when above the power or energy demands for that of the primary energy component. An example of an energy source selector in accordance with the present disclosure may include one or more diodes, and/or an integrated circuit that may be used to represent one or more diodes without departing from the scope of the present disclosure. For example, though the present disclosure is not limited to only this embodiment, an energy source selector may include a controller and/or integrated circuit available from Linear Technology, such as model number LTC4412HV.

Further, one or more components of the power management system 100 may be able to determine if the primary energy source is below a pre-determined threshold amount, such as if the primary energy source is fully discharged or discharged past a point of use. For example, the energy source detectors 108, the controller 110, and/or the energy source selector 112 may be able to measure and determine if the first energy source 102 and/or the second energy source 104, whichever may be the primary energy source, is below a pre-determined threshold amount no longer suitable for use. In such an embodiment, the controller 110 may then designate the energy source that was previously designated as the secondary energy source as the primary energy source such that the former secondary energy source may be used to provide power or energy to the energy-powered component 106.

Furthermore, an energy source used with a power management system in accordance with the present disclosure may enable one power source to be removed and/or replaced while the energy-powered component remains powered from the other power source. As such, the power management system does not require the energy-powered component to be powered off or have a lapse in power when replacing an energy source, as each of the energy sources, as discussed above, may be used to individually power the energy-powered component.

Referring still to FIG. 1, the power management system 100 may also include an external power detector 114. The external power detector 114 may be used to determine if an external power source 116 is available, such as operatively coupled to the power management system 100. In an embodiment in which the external power source 116 is available, one or more components of the power management system 100 may be able to enable the external power source 116 to provide power or energy to the energy-powered component 106 while also disabling the primary energy source from providing power or energy to the energy-powered component 106. For example, the energy source selector 112 and/or the controller 110 may be used to enable the external power source 116 to provide power or energy to the energy-powered component 106, in addition to also disabling the primary energy source from providing power or energy to the energy-powered component 106. Further, if additional power or energy is needed for the energy-powered component 106, the primary energy source may be used to supplement the additional power or energy needed, followed by the secondary energy source, similar to as discussed above. An example of an external power detector in accordance with the present disclosure may include a voltage comparator, though other examples of external power detectors may be used without departing from the scope of the present disclosure.

In accordance with one or more embodiments of the present disclosure, the energy sources included with the power management system 100, such as the first energy source 102 and the second energy source 104, may include a depletable energy source. An example of a depletable energy source may include a solar cell or a battery, such as a disposable battery or a rechargeable battery, and/or any other similar type of energy source known in the art. Further, in accordance with one or more embodiments of the present disclosure, the external power source 116 used with the power management system 100 may include a non-depletable energy source. An example of a non-depletable energy source may include energy received, either directly or indirectly, from a power station and/or generator, and/or any other similar type of energy source known in the art. As such, power or energy received from a depletable energy source may deplete or degrade over time, such as in voltage and/or current received from the source, whereas power or energy received from a non-depletable energy source may not-deplete or degrade over time.

In accordance with one or more embodiments of the present disclosure, the power management system 100 may include one or more switches. In particular, a switch may be used at least between the energy source selector 112 and the first energy source and/or the second energy source, such as the primary energy source and/or the secondary energy source, to selectively disable the energy sources from providing power to the energy-powered component 106. For example, with reference to FIG. 1, a first switch 118A may be positioned between the first energy source 102 and the energy source selector 112 to selectively enable and disable the first energy source 102 from providing power to the energy-powered component 106. Further, a second switch 118B may be positioned between the second energy source 104 and the energy source selector 112 to selectively enable and disable the second energy source 104 from providing power to the energy-powered component 106. An example of a switch in accordance with the present disclosure may include a solid state switch, though other examples of switches may be used without departing from the scope of the present disclosure.

Further, one or more energy source detectors 108 may be operably coupled to one or more of the switches 118 such that the energy source detector 108 may be used to selectively open and close the switch 118. For example, in an embodiment in which the power management system 100 includes the first energy source detector 108A, the second energy source detector 108B, the first switch 118A, and the second switch 118B, the first energy source detector 108A may be operably coupled to the first switch 118A and/or the second energy source detector 108B may be operably coupled to the second switch 118B.

In such an embodiment, the first energy source detector 108A may be used to selectively open and close the first switch 118A. For example, the first energy source detector 108A may receive an input 120A from the second energy source 104 indicating the SOC for the second energy source 104, and may also receive an input 120B from the controller 110 indicating the SOC for the first energy source 102. Based upon the inputs 120A and 120B, if the first energy source 102 is to be the primary energy source, the first energy source detector 108A may close the first switch 118A such that the first energy source 102 is enabled to provide power or energy to the energy-powered component 106, such as through the energy source selector 112. If the first energy source 102 is to be the secondary energy source, the first energy source detector 108A may open the first switch 118A such that the first energy source 102 is disabled to provide power or energy to the energy-powered component 106.

Similarly, the second energy source detector 108B may be used to selectively open and close the second switch 118B. The second energy source detector 108B may receive an input 122A from the first energy source 102 indicating the SOC for the first energy source 102, and may also receive an input 122B from the controller 110 indicating the SOC for the second energy source 104. Based upon the inputs 122A and 122B, if the second energy source 104 is to be the primary energy source, the second energy source detector 108B may close the second switch 118B such that the second energy source 104 is enabled to provide power or energy to the energy-powered component 106, such as through the energy source selector 112. If the second energy source 104 is to be the secondary energy source, the second energy source detector 108B may open the second switch 118B such that the second energy source 104 is disabled to provide power or energy to the energy-powered component 106.

Referring still to FIG. 1, the energy source selector 112 may have one or more inputs and/or one or more outputs. For example, the energy source selector 112 may receive an input 124A from the first energy source 102, such as to indicate a SOC of the first energy source 102, may receive an input 124B from the second energy source 104, such as to indicate a SOC of the second energy source 104, may receive an input 124C from the controller 110, such as to receive one or more control signals from the controller 110, and may receive an input 124D from the external power source detector 114, such as to indicate a presence and/or amount of power or energy available from the external power source 116. Further, the energy source selector 112 may send an output 124E to the controller 110, such as to indicate a SOC of the first energy source 102, may send an output 124F to the controller 110, such as to indicate a SOC of the second energy source 104.

Further, the controller 110 may have one or more inputs and/or one or more outputs as well. The controller 110 may receive an input 126A from the energy source selector 112, such as to indicate a SOC of the first energy source 102, and may receive an input 126B from the energy source selector 112, such as to indicate a SOC of the second energy source 104. The controller 110 may send an output 126C to the second energy source detector 108B, such as to indicate a SOC of the first energy source 102, may send an output 126D to the first energy source detector 108A, such as to indicate a SOC of the second energy source 104, and may send an output 126E to the energy source selector 112, such as to send one or more control signals to the energy source selector 112.

One having ordinary skill in the art will appreciate that a state-of-charge of an energy source may be determined using multiple different methods and techniques. For example, in the present disclosure, a voltage comparator may be used to determine a SOC between the energy sources. Further, those having ordinary skill in the art will appreciate that other methods and techniques may additionally, or alternatively, be used when determining a SOC amongst the energy sources. For example, a voltage-based method may be used, as discussed above, that converts a reading of a voltage of an energy source to a SOC. A current-based method may be used that measures a current of an energy source and calculates a SOC over time. A chemical-based method may be used that measures a specific gravity and/or acidity of an energy source to determine the SOC for the energy source. Further, a Kalman filtering method may be used that incorporates a Kalman filter to determine a SOC of an energy source, and/or a pressure method may be used that determines a SOC for an energy source based upon internal pressure. Accordingly, the present disclosure contemplates multiple methods, embodiments, and arrangements for measuring a SOC of an energy source without departing from the scope of the present disclosure.

Figure 2A:
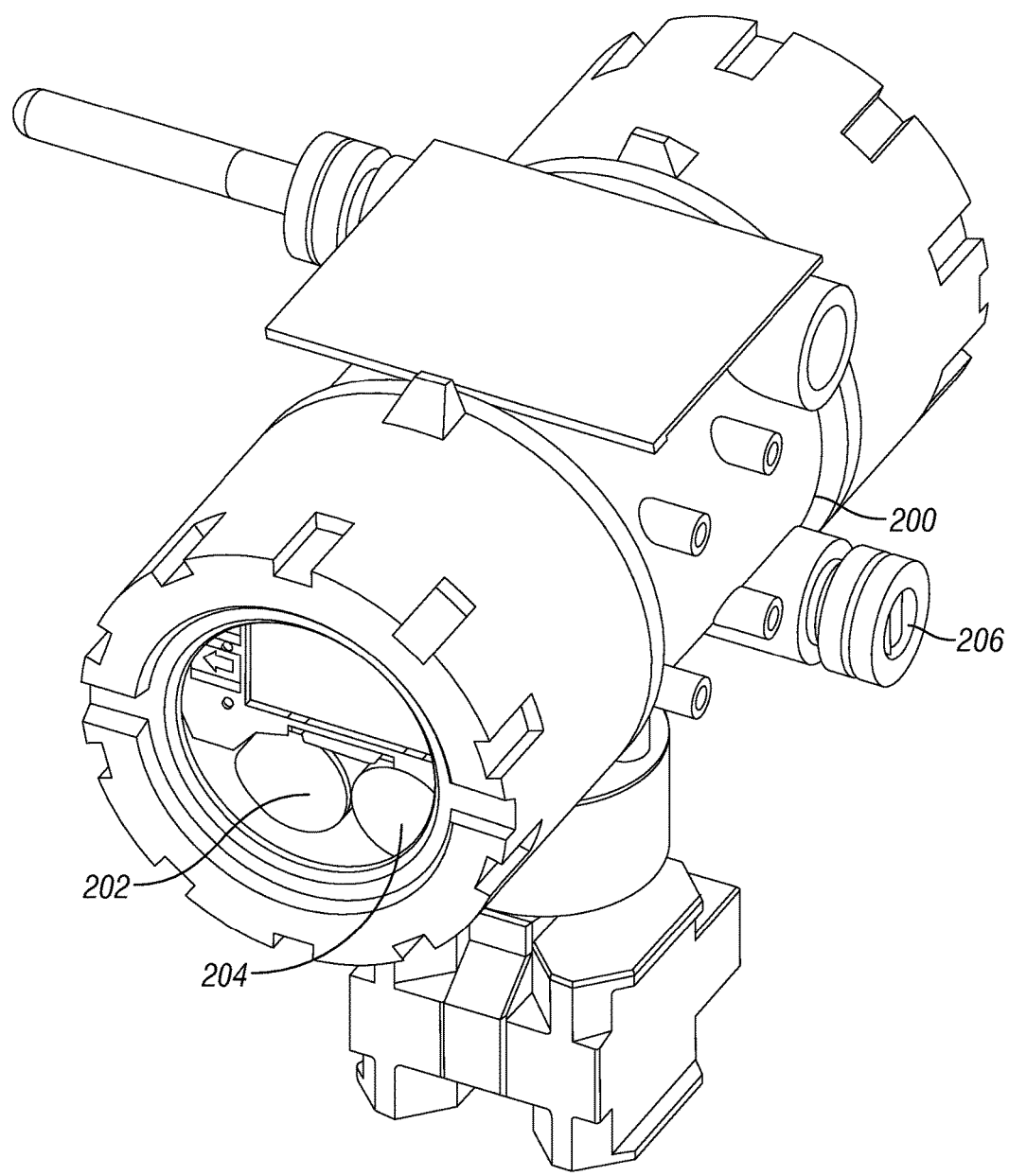
FIGS. 2A-2C show multiple views of a power management system in accordance with one or more embodiments of the present disclosure.
Figure 2B:
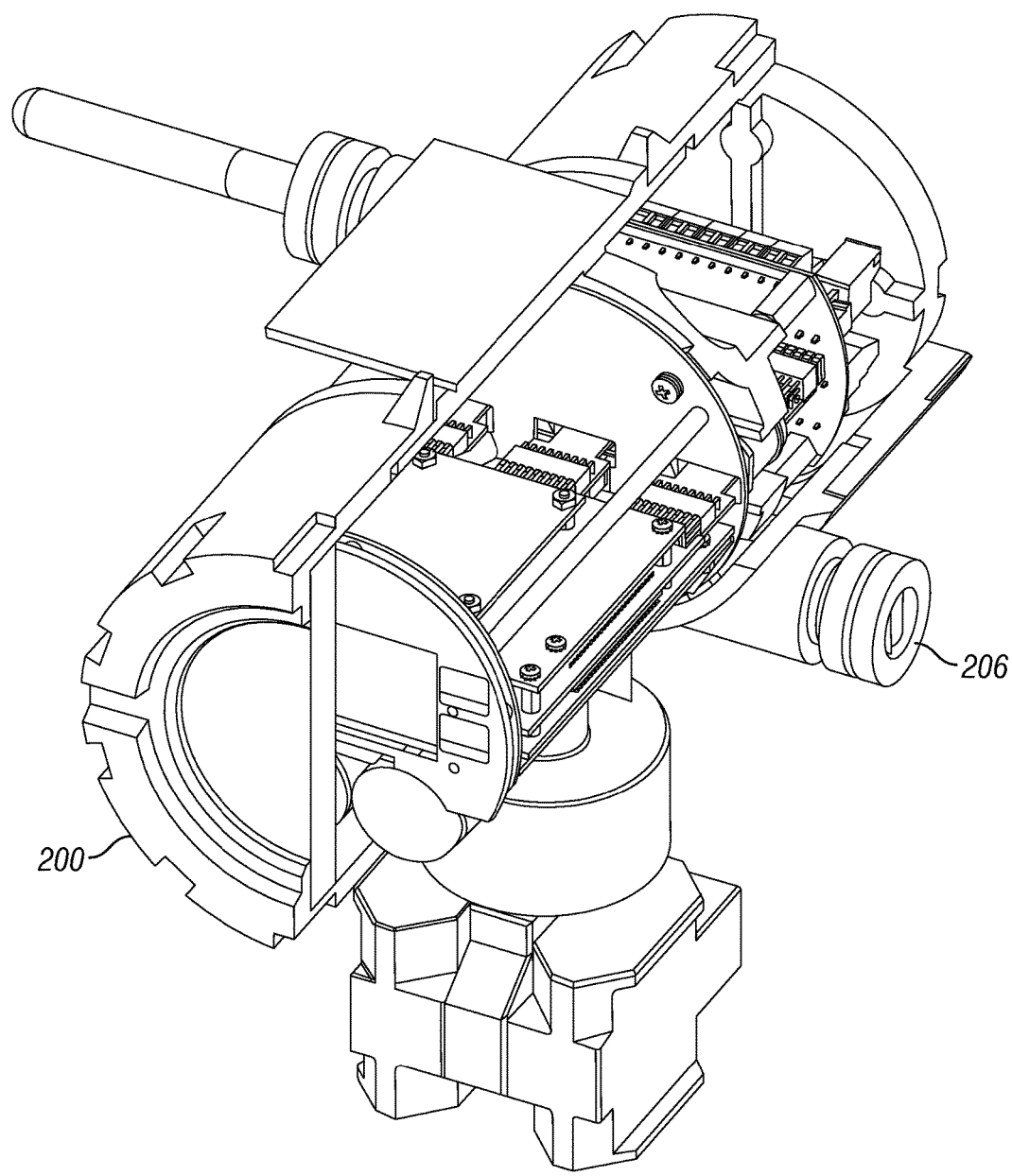
Figure 2C:
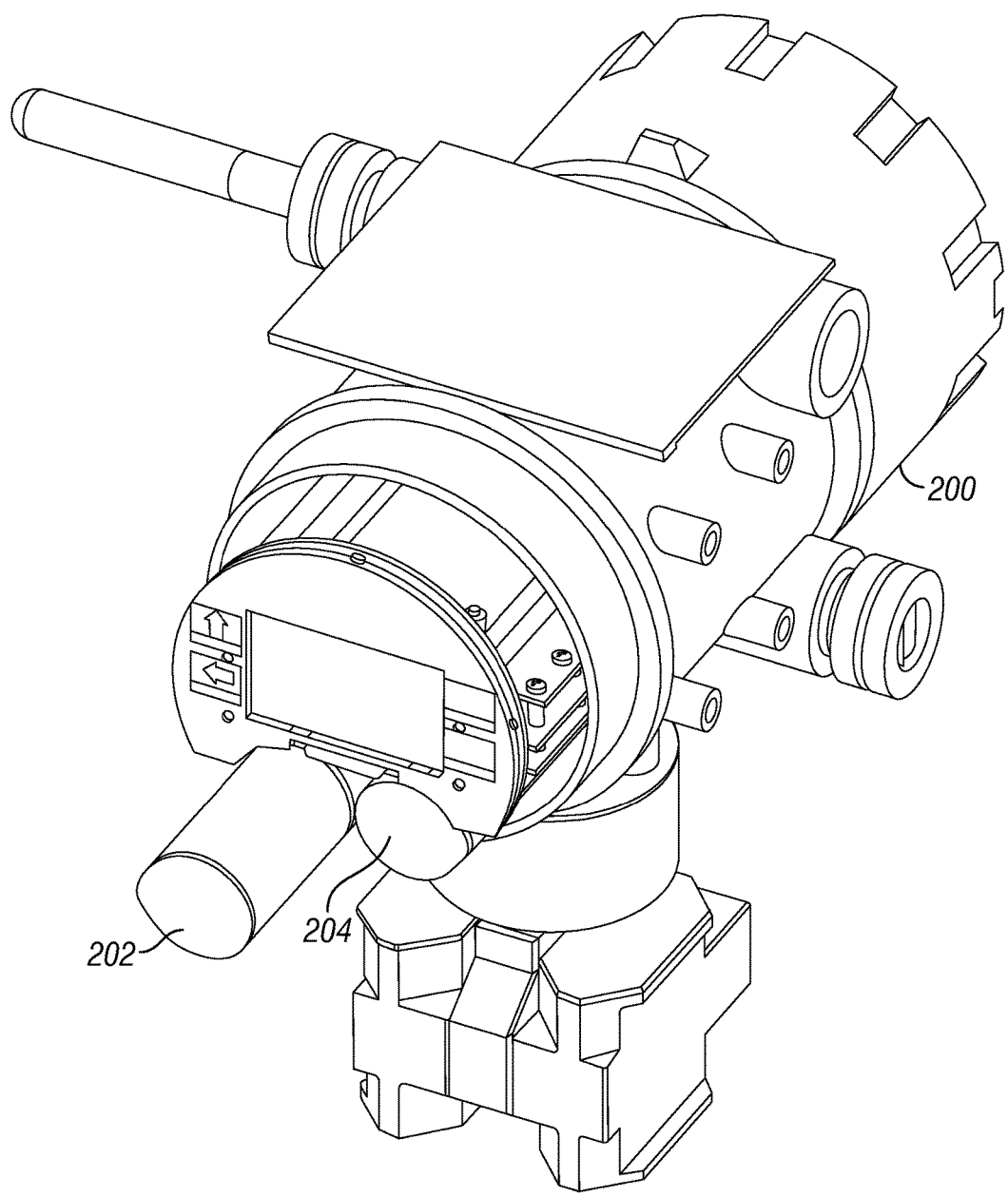

Referring now to FIGS. 2A-2C, multiple views of an explosion proof enclosure 200 in accordance with one or more embodiments of the present disclosure are shown. A power management system, such as shown in FIG. 1, may be incorporated within the explosion proof enclosure 200, in which the power management system may be intrinsically safe for use within a hazardous environment. FIG. 2A shows a perspective view of the enclosure 200 when assembled; FIG. 2B shows a perspective view of the enclosure 200 with a front cover removed; and FIG. 2C shows a perspective view of the enclosure 200 with a portion removed to view internal components.

As discussed, the explosion proof enclosure 200 may be used, such as to house one or more components for the power management system 100. For example, the energy source detector(s), the controller, the energy source selector, and/or the external power detector may be included and positioned within the explosion proof enclosure 200. Further, the energy sources may also be included and positioned within the explosion proof enclosure 200. For example, a first power source 202 and a second power source 204 may be included within and removable from the explosion proof enclosure 200.

Further, the explosion proof enclosure 200 may include one or more electrical connectors 206. As such, in this embodiment, an external power source may be coupled to the electrical connector 206 to provide external power to the power management system included therein. As such, in one or more embodiments, an external power source may be defined as a power source external to the explosion proof enclosure 200, whereas the energy sources within the power management system, such as the first energy source 102 (e.g., 202) and the second energy source 104 (e.g., 204) may be positioned internally within the explosion proof enclosure 200.

As such, in accordance with one or more embodiments of the present disclosure, "explosion proof," as used herein, is used in a context consistent with the National Fire Protection Association (NFPA) and the National Electric Code (NEC®), both of which have helped define the term "explosion proof." Definitions for several types of protection techniques acceptable when designing products for use in hazardous (classified) locations include, but are not limited to: explosion proof, dust ignition proof, dust tight, purged/pressurized, intrinsically safe, and hermetically sealed. These definitions set the criteria that must be met by all components installed in hazardous (classified) locations. As such, in accordance with one or more embodiments, to meet the criteria for the explosion proof rating, an enclosure is be able to contain any explosion originating within its housing and to prevent sparks from within its housing from igniting vapors, gases, dust, and/or fibers in the air surrounding it. Therefore, explosion proof, when referring to electrical enclosures, does not mean that it is able to withstand an exterior explosion. Instead, it is the enclosures ability to prevent an internal spark or explosion from causing a much larger blast. Additionally, in one or more embodiments, an explosion proof enclosure is able to meet the temperature requirements of the specific application in which it is to be installed. This means that the operating temperature of the motor (and its enclosure) or other component cannot be greater than the lowest ignition/combustion temperature of the gases or dusts in the atmosphere where the component is to be installed.

An apparatus in accordance with the present disclosure may provide one or more of the following advantages. An apparatus in accordance with the present disclosure may be intrinsically safe such that the apparatus may be used within a hazardous environment. The apparatus as discussed and described above may be limited in the maximum energy stored, power consumption, and/or used with the apparatus to prevent sparking or excessive heat. For example, a power management system of the present disclosure may be capable of consuming only very low amounts of power for extended periods of time. In one embodiment, when paired with a high-power processor, the power management system of the present disclosure may provide energy and maintain real-time functions, and then only awaken and use the high-power processor when required for certain functions.

Although the present invention has been described with respect to specific details, it is not intended that such details should be regarded as limitations on the scope of the invention, except to the extent that they are included in the accompanying claims.

What is claimed is:

1. A power management system to manage energy sources for use with an energy-powered component, comprising:
    an energy source detector for each energy source, each energy source detector to measure a state-of-charge of each of the energy sources and to determine the energy source with the lowest state-of-charge;
    a controller to designate the energy source with the lowest state-of-charge as a primary energy source and any other energy source as a secondary energy source, the controller to measure an amount of power required by the energy-powered component and determine if the amount of power required by the energy-powered component is above an amount of power available from the primary energy source; and
    an energy source selector to selectively enable the primary energy source to provide power to the energy-powered component, or both the primary energy source and the secondary energy source to provide power to the energy-powered component if power required by the energy-powered component is above the amount of power available from the primary energy source.

2. The power management system of claim 1, wherein the energy source selector is configured to disable the secondary energy source from providing power to the energy-powered component.

3. The power management system of claim 1, further comprising:
    an external power detector to determine if an external power source is available;
    wherein the energy source selector is configured to enable the external power source to provide power to the energy-powered component; and
    wherein the energy source selector is configured to disable the primary energy source from providing power to the energy-powered component.

4. The power management system of claim 3, wherein the energy sources comprise depletable energy sources, and wherein the external power source comprises a non-depletable energy source.

5. The power management system of claim 4, wherein at least one of the energy sources comprises a battery.

6. The power management system of claim 3, further comprising:
    an explosion proof enclosure including an electrical connector with the energy source detectors, the controller, the energy source selector, the external power detector, and the energy sources positioned within the explosion proof enclosure; and
    wherein the external power source is positioned external the explosion proof enclosure and is coupled to the electrical connector of the explosion proof enclosure.

7. The power management system of claim 1, wherein the energy source selector allows the primary energy source and the secondary energy source to provide power to the energy-powered component at a ratio inversely proportional to a source impedance of the primary energy source to a source impedance of the secondary energy source.

8. The power management system of claim 1, further comprising:
    a switch between the energy sources and the energy source selector to selectively disable the energy sources from providing power to the energy-powered component.

9. The power management system of claim 1, further comprising:
    a switch between each energy source and the energy source selector to selectively enable and disable each energy source to provide power to the energy-powered component.

10. The power management system of claim 9, wherein each energy source detector is operably coupled to each switch to selectively open and close the switch.

11. The power management system of claim 1, wherein, when the state-of-charge of the primary energy source is below a pre-determined threshold amount, the controller designates another energy source as the primary energy source.

12. A method to manage energy sources for use with an energy-powered component, the method comprising:
    coupling the energy sources to a plurality of energy source detectors;
    measuring a state-of-charge of each energy source with each of the energy source detectors;
    determining which energy source has a lowest state-of-charge with each of the energy source detectors;
    designating the energy source with the lowest state-of-charge as a primary energy source;
    designating any other energy source as a secondary energy source;
    selectively enabling the primary energy source to provide power to the energy-powered component;
    measuring an amount of power required by the energy-powered component;
    determining if the amount of power required by the energy-powered component is above an amount of power available from the primary energy source; and
    enabling the primary energy source and the secondary energy source to provide power to the energy-powered component if power required by the energy-powered component is above the amount of power available from the primary energy source.

13. The method of claim 12, further comprising:
    disabling the secondary energy source from providing power to the energy-powered component; and
    enabling the primary energy source only to provide power to the energy-powered component.

14. The method of claim 13, wherein disabling the secondary energy source comprises opening a switch between the secondary energy source and the energy-powered component.

15. The method of claim 14, wherein one of the energy source detectors is operably coupled to the switch to selectively open and close the switch.

16. The method of claim 12, wherein, when the state-of-charge of the primary energy source is below a pre-determined threshold amount, another energy source is designated as the primary energy source.

17. The method of claim 12, further comprising:
   determining if an external power source is available;
   enabling the external power source to provide power to the energy-powered component; and
   disabling the primary energy source from providing power to the energy-powered component.

18. The method of claim 12, further comprising enabling the primary energy source and the secondary energy source to provide power to the energy-powered component at a ratio inversely proportional to a source impedance of the primary energy source to a source impedance of the secondary energy source.

* * * * *